(12) United States Patent
Cheng et al.

(10) Patent No.: US 11,370,247 B2
(45) Date of Patent: Jun. 28, 2022

(54) AUTOMOBILE HUB WITH HOLLOW RIM, HUB ASSEMBLING METHOD AND AUTOMOBILE

(71) Applicant: CITIC Dicastal CO., LTD., Hebei (CN)

(72) Inventors: Chuan Cheng, Qinhuangdao (CN); Changhai Li, Qinhuangdao (CN); Xu Wang, Qinhuangdao (CN); Hongbiao Li, Qinhuangdao (CN); Lin Zhu, Qinhuangdao (CN); Zhen Li, Qinhuangdao (CN); Yule Zhou, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 371 days.

(21) Appl. No.: 16/550,155

(22) Filed: Aug. 23, 2019

(65) Prior Publication Data

US 2020/0290396 A1 Sep. 17, 2020

(30) Foreign Application Priority Data

Mar. 14, 2019 (CN) .......................... 201910195228.3

(51) Int. Cl.
*B60B 3/04* (2006.01)
*B60B 21/02* (2006.01)
*B60B 25/00* (2006.01)
*B60B 5/02* (2006.01)
(Continued)

(52) U.S. Cl.
CPC .............. *B60B 3/044* (2013.01); *B60B 3/045* (2013.01); *B60B 21/025* (2013.01); *B60B 25/004* (2013.01); *B60B 5/02* (2013.01); *B60B 27/0015* (2013.01); *B60B 30/08* (2013.01)

(58) Field of Classification Search
CPC ......... B60B 21/02; B60B 3/044; B60B 3/045; B60B 27/0015; B60B 30/08; B60B 5/02; B60B 2360/104; B60B 2900/111; B60B 1/06; B60B 25/004; B60B 21/025
See application file for complete search history.

(56) References Cited

U.S. PATENT DOCUMENTS

| | | | | |
|---|---|---|---|---|
| 5,538,329 A | * | 7/1996 | Stach | ........................ B60B 1/00 29/894.342 |
| 5,575,539 A | * | 11/1996 | Stach | ........................ B60B 1/00 301/65 |

(Continued)

FOREIGN PATENT DOCUMENTS

WO WO-9731792 A1 * 9/1997 ............. B21D 53/30

*Primary Examiner* — Kip T Kotter
(74) *Attorney, Agent, or Firm* — Syncoda LLC; Feng Ma

(57) ABSTRACT

An automobile hub with a hollow rim includes a wheel disc and the rim with at least one hollow cavity, in which the rim includes at least two mutually nested rings and an axial end cap at the same ends of the at least two rings, and the hollow cavity consists of the rings and the axial end cap. The outer side of one end of the wheel disc includes axial rim mounting grooves, and the rim is inserted into the rim mounting grooves and fixed to the wheel disc through the end without the axial end cap. By employing the automobile hub with the hollow rim, the hub assembling method, and the automobile having the hub, the weight of the hub can be further reduced, and the hub has sufficient strength.

8 Claims, 10 Drawing Sheets

(51) Int. Cl.
*B60B 27/00* (2006.01)
*B60B 30/08* (2006.01)

(56) References Cited

U.S. PATENT DOCUMENTS

| | | | | |
|---|---|---|---|---|
| 5,718,485 A | * | 2/1998 | Stach | B60B 21/025 |
| | | | | 228/114.5 |
| 6,024,415 A | * | 2/2000 | Stach | B60B 1/08 |
| | | | | 301/64.203 |
| 6,138,730 A | * | 10/2000 | Fotij | B60B 3/00 |
| | | | | 301/95.104 |
| 6,152,351 A | * | 11/2000 | Separautzki | B60B 25/004 |
| | | | | 228/144 |
| 6,312,059 B1 | * | 11/2001 | Stach | B60B 1/06 |
| | | | | 301/65 |
| 2003/0037853 A1 | * | 2/2003 | Emberger | B60B 21/00 |
| | | | | 152/379.3 |

\* cited by examiner

AUTOMOBILE HUB WITH HOLLOW RIM, HUB ASSEMBLING METHOD AND AUTOMOBILE

CROSS-REFERENCE TO RELATED APPLICATIONS

The present application claims benefit of Chinese Application No. 201910195228.3, filed on Mar. 14, 2019, the disclosure of which is hereby incorporated by reference in its entirety.

BACKGROUND

Aluminum alloy hubs have been widely used in the passenger car market due to the elegant appearance, high safety and excellent comfort. Specifically, aluminum alloy hubs have the following advantages:

(1) the weight is low, so the deformation and inertia resistance are small during high-speed rotation;

(2) the metallic features of absorbing vibration and rebounding force are better, so as to reduce the vibration of moving automobiles;

(3) the cutting performance is good so that higher dimensional accuracy can be realized more easily, and the hub has high roundness, small runout and better balance, allowing automobiles to travel stably and comfortably; and (4) aluminum alloy hubs after anti-corrosion treatment, painting and coloring have various colors, and are exquisite and attractive in appearance.

However, currently prepared hubs are mostly of a single-layer hub structure. In order to have higher strength, the radial thickness of the hub is large, resulting in overweight of the whole hub, thus losing the advantage of light weight of aluminum alloy.

SUMMARY

The disclosure relates to the automobile hub technology, in particular to an automobile hub with a hollow rim, a hub assembling method and an automobile.

In view of this, the embodiments of the disclosure hope to provide an automobile hub with a hollow rim, a hub assembling method and an automobile, so as to further reduce the weight of the hub and realize enough strength.

In order to achieve the above purpose, the technical solution of the embodiments of the disclosure are realized as follows:

The embodiments of the disclosure provide an automobile hub with a hollow rim, the hub includes a wheel disc and the rim with at least one hollow cavity, the rim includes at least two mutually nested rings and an axial end cap at the same ends of the at least two rings, and the hollow cavity consists of the rings and the axial end cap; and the outer side of one end of the wheel disc includes axial rim mounting grooves, and the rim is inserted into the rim mounting grooves and fixed to the wheel disc through the end without the axial end cap.

In the above solution, the rim includes two mutually nested rings, namely an outer rim arranged on the outer side and an inner rim arranged on the inner side, the outer side of one end of the wheel disc includes two rim mounting grooves, and the rim is inserted into the rim mounting grooves and fixed to the wheel disc through one end of the outer rim and one end of the inner rim respectively.

In the above solution, the axial end cap further includes at least one charging pipe joint and a sealing plug, one end of the charging pipe joint communicates with the hollow cavity, and the other end is filled with the sealing plug.

In the above solution, the wheel disc and the rim are both made of aluminum alloy.

In the above solution, the thickness of the outer rim or the inner rim is 1-3 mm.

In the above solution, the widths of the rim mounting grooves are 1-3 mm and the depths are 4-6 mm.

The embodiments of the disclosure further provide a method for assembling an automobile hub with a hollow rim, and the method includes the following steps:

inserting one ends of a plurality of rings forming the rim into rim mounting grooves of a wheel disc and fixing the rings; and mounting an axial end cap to the end faces of the rings from the other ends of the plurality of rings to form the rim with at least one hollow cavity.

In the above solution, the step of inserting one ends of the plurality of rings forming the rim into the rim mounting grooves of the wheel disc and fixing the rings includes:

inserting one ends of the plurality of rings forming the rim into the rim mounting grooves of the wheel disc and fixing the rings to the wheel disc through welding.

In the above solution, the step of mounting the axial end cap to the end faces of the rings from the other ends of the plurality of rings to form the rim with at least one hollow cavity includes:

mounting the axial end cap to the end faces of the rings from the other ends of the plurality of rings, injecting air with a preset pressure into the hollow cavity through the charging pipe joint of the axial end cap, and then putting a sealing plug into the charging pipe joint to form the rim with at least one hollow cavity.

The embodiments of the disclosure also provide an automobile, which includes a body and wheels, in which the wheel includes any one of the automobile hubs with the hollow rim as described above.

According to the automobile hub with the hollow rim, the hub assembling method and the automobile in the embodiments of the disclosure, the automobile hub with the hollow rim includes a wheel disc and the rim with at least one hollow cavity, the rim includes at least two mutually nested rings and an axial end cap at the same ends of the at least two rings, and the hollow cavity consists of the rings and the axial end cap; and the outer side of one end of the wheel disc includes axial rim mounting grooves, and the rim is inserted into the rim mounting grooves and fixed to the wheel disc through the end without the axial end cap. Therefore, according to the automobile hub with the hollow rim, the hub assembling method and the automobile in the embodiments of the disclosure, by arranging the rim with at least one hollow cavity, the weight of the hub can be further reduced, and the rim has enough strength.

Other beneficial effects of the embodiments of the present disclosure will be further explained in the detailed description in conjunction with specific technical solutions.

BRIEF DESCRIPTION OF DRAWINGS

In order to explain the technical solutions in the embodiments of the present disclosure more clearly, the drawings needed in the description of the embodiments will be briefly explained below. It should be understood that the drawings described below are only a part of the drawings of the embodiments of the present disclosure, and other drawings can be obtained according to these drawings without creative labor for those skilled in the art.

DETAILED DESCRIPTION

Figure 1:
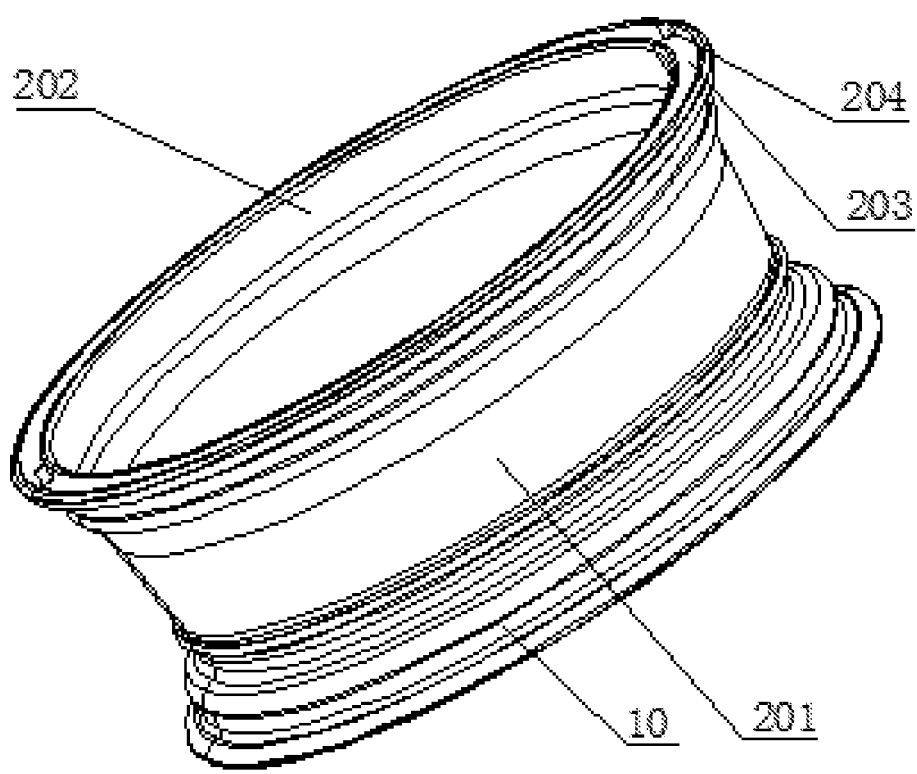
FIG. 1 is a schematic diagram of an automobile hub with a hollow rim according to Embodiment 1 of the present disclosure.

It should be noted that in the description of the embodiments of the present disclosure, unless otherwise specified and limited, the term "connection" should be understood broadly, for example, it can be electrical connection or internal communication between two elements, it can be direct connection or indirect connection through a medium, and for a person of ordinary skill in the art, the specific meaning of the above term can be understood according to the specific situation.

It should be noted that the terms "first, second, and third" in the embodiments of the present disclosure are only used to distinguish similar objects and do not represent a specific order of the objects. It is understood that the sequence of "first, second, and third" can be interchanged if allowed.

The embodiments of the disclosure provide an automobile hub with a hollow rim, the hub includes a wheel disc and the rim with at least one hollow cavity, the rim includes at least two mutually nested rings and an axial end cap at the same ends of the at least two rings, and the hollow cavity consists of the rings and the axial end cap; and the outer side of one end of the wheel disc includes axial rim mounting grooves, and the rim is inserted into the rim mounting grooves and fixed to the wheel disc through the end without the axial end cap.

Herein the wheel disc includes a flange, an outer peripheral portion of the flange, spokes and the like. It will not be described in detail here.

The nesting means that the inner ring is sleeved with the outer ring. The two adjacent rings and the axial end cap form the hollow cavity, so that compared with a single-layer rim, with the same thickness, the weight of the rim with the hollow cavity is lower. Each of the plurality of individual rings has a small radial thickness, finer grains can be obtained in casting, as a result, the overall strength or comprehensive mechanical property is not lower than that of the single-layer rim after combination.

According to the automobile hub with the hollow rim in the embodiments of the disclosure, the weight of the hub can be further reduced by arranging the rim with at least one hollow cavity, and the hub has enough strength.

In one embodiment, the rim may include two mutually nested rings, namely an outer rim arranged on the outer side and an inner rim arranged on the inner side, the outer side of one end of the wheel disc includes two rim mounting grooves, and the rim is inserted into the rim mounting grooves and fixed to the wheel disc through one end of the outer rim and one end of the inner rim respectively. In this way, the structure is simpler and the weight can be reduced a lot. It can be understood that more than two rings are also feasible.

In one embodiment, the axial end cap may further include at least one charging pipe joint and a sealing plug, one end of the charging pipe joint communicates with the hollow cavity, and the other end is filled with the sealing plug. In this way, air with a preset pressure can be injected into the hollow cavity through the charging pipe joint, thereby balancing the tire pressure and further enhancing the strength of the hub. Within a certain range, the higher the air pressure is, the higher the strength is, which is the preferred mode. The preset pressure of the air here is a pressure corresponding to the air pressure in a rubber tire of an automobile.

In one embodiment, the wheel disc and the rim are both made of aluminum alloy. Aluminum alloy is lighter, and is the main configuration for automobiles such as passenger cars which require high acceleration performance. It can be understood that other metal materials with certain strength, such as steel, iron and copper, are feasible.

In one embodiment, the thicknesses of the outer rim and the inner rim may be 1-3 mm. In this way, on the one hand, the weight can be reduced, and on the other hand, enough strength can be obtained, which is the preferred mode.

In one embodiment, the widths of the rim mounting grooves may be 1-3 mm and the depths may be 4-6 mm. This can facilitate the installation of the outer rim and the inner rim and ensure the firmness of the installation, which is the preferred mode.

The embodiments of the disclosure further provide a method for assembling an automobile hub with a hollow rim, and the method includes the following steps:

one ends of a plurality of rings forming the rim are inserted into rim mounting grooves of a wheel disc and fixing the rings; and an axial end cap is mounted to the end faces of the rings from the other ends of the plurality of rings to form the rim with at least one hollow cavity.

In one embodiment, the step of inserting one ends of the plurality of rings forming the rim into the rim mounting grooves of the wheel disc and fixing the rings may include:

one ends of the plurality of rings forming the rim are inserted into the rim mounting grooves of the wheel disc and the rings are fixed to the wheel disc through welding. During the manufacturing of automobile hubs, the welding fixation technology is mature, the structure is simple, and certain sealing performance is realized, which is the preferred method.

In one embodiment, the step of mounting the axial end cap to the end faces of the rings from the other ends of the plurality of rings to form the rim with at least one hollow cavity may include:

the axial end cap is mounted to the end faces of the rings from the other ends of the plurality of rings, in which air with a preset pressure is injected into the hollow cavity through the charging pipe joint of the axial end cap, and then a sealing plug is put into the charging pipe joint to form the rim with at least one hollow cavity.

In this way, air with a preset pressure can be injected into the hollow cavity through the charging pipe joint, thereby balancing the tire pressure and further enhancing the strength of the hub. Within a certain range, the higher the air pressure is, the higher the strength is, which is the preferred mode. The preset pressure of the air here is a pressure corresponding to the air pressure in a rubber tire of an automobile.

The embodiments of the disclosure also provide an automobile, which includes a body and wheels, in which the wheel includes any one of the automobile hubs with the hollow rim as described above. Cars equipped with such hubs have lower fuel consumption.

The present disclosure will be described in further detail below with reference to the accompanying drawings and specific embodiments. It should be understood that the specific embodiments described herein are only for the purpose of explaining the present disclosure and are not intended to limit the present disclosure; moreover, the embodiments described below are only a part of the embodiments of the present disclosure, not all of the embodiments. According to these embodiments, all other embodiments obtained without creative labor by a person of ordinary skill in the art are within the scope of protection of the present disclosure.

Embodiment 1

Figure 2:
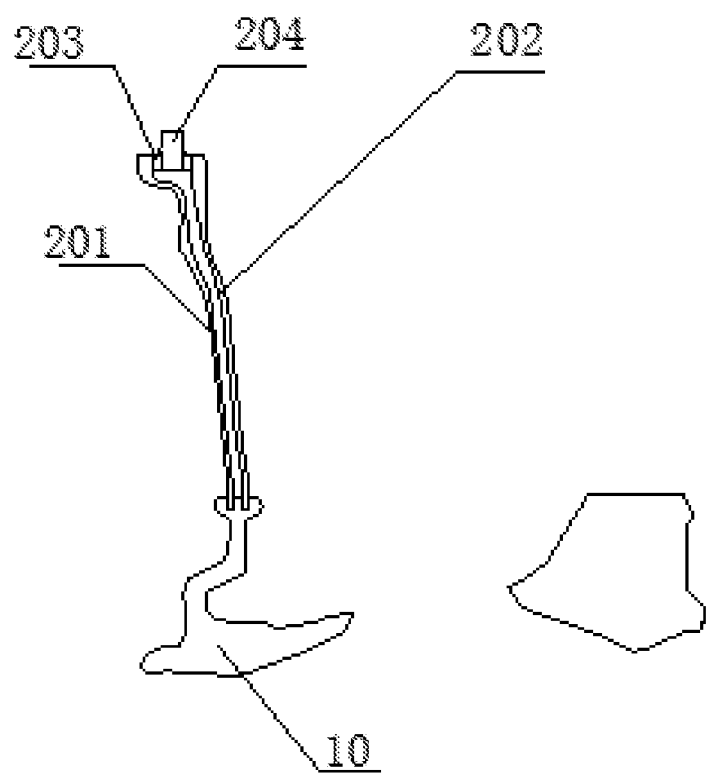
FIG. 2 is a schematic diagram of a semi-sectional view of FIG. 1.

FIG. 1 is a schematic diagram of an automobile hub with a hollow rim according to Embodiment 1 of the present disclosure, and FIG. 2 is a schematic diagram of a semi-sectional view of FIG. 1. In this embodiment, the automobile hub with the hollow rim includes a hollow cavity. It can be understood that the structural principle of the embodiment of the present disclosure can also be applied to an aluminum alloy hub with a rim having more than two hollow cavities.

Figure 3:
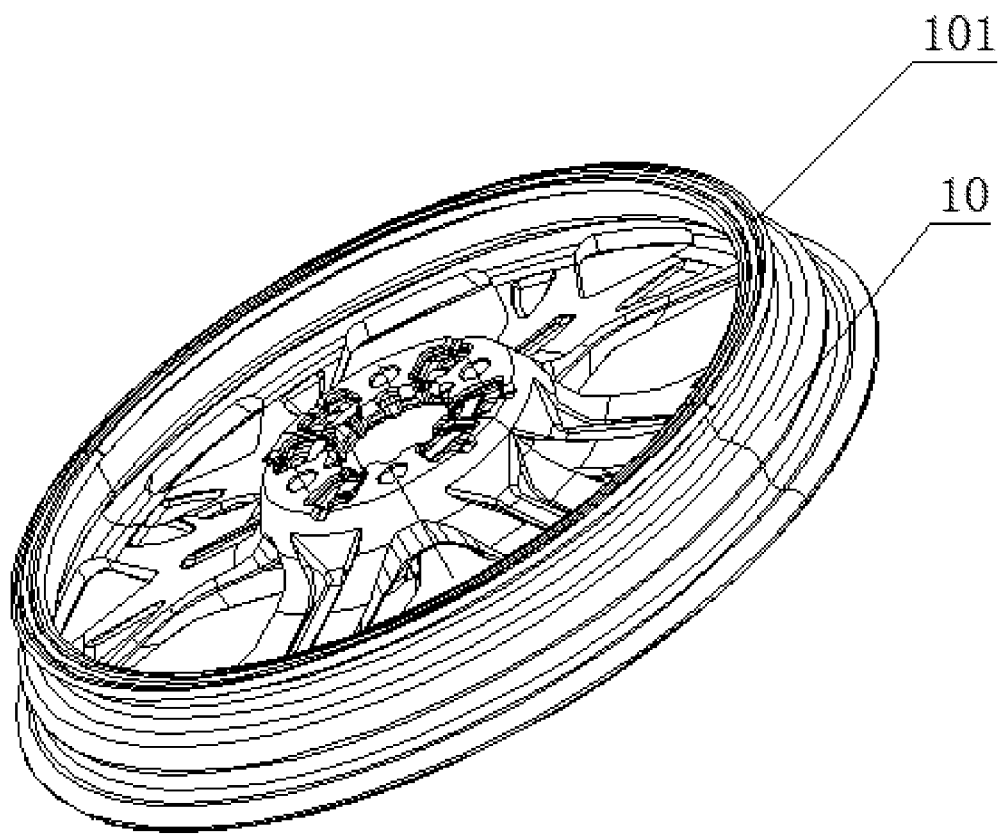
FIG. 3 is a schematic diagram of a wheel disc in an automobile hub with a hollow rim according to Embodiment 1 of the present disclosure.
Figure 4:
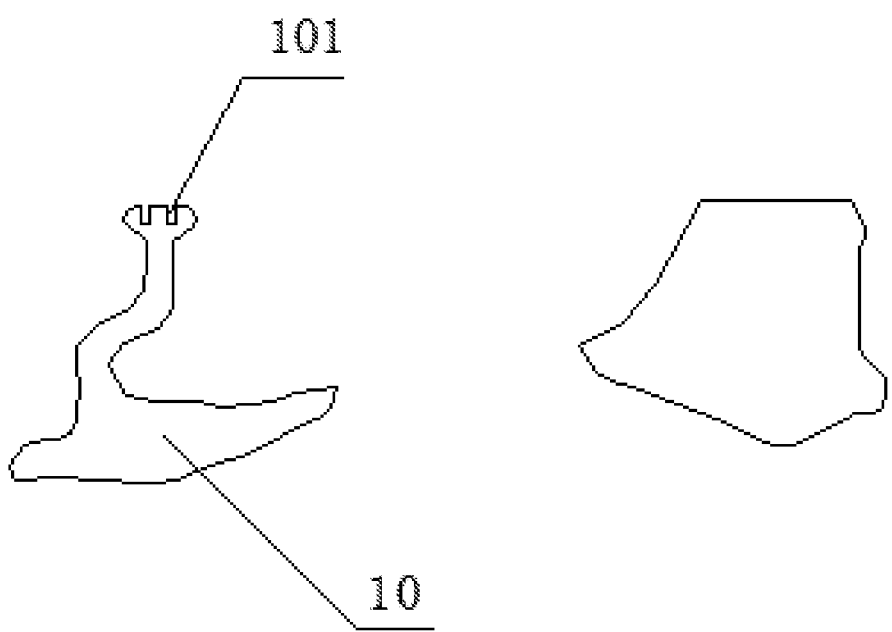
FIG. 4 is a schematic diagram of a semi-sectional view of FIG. 3.
Figure 5:
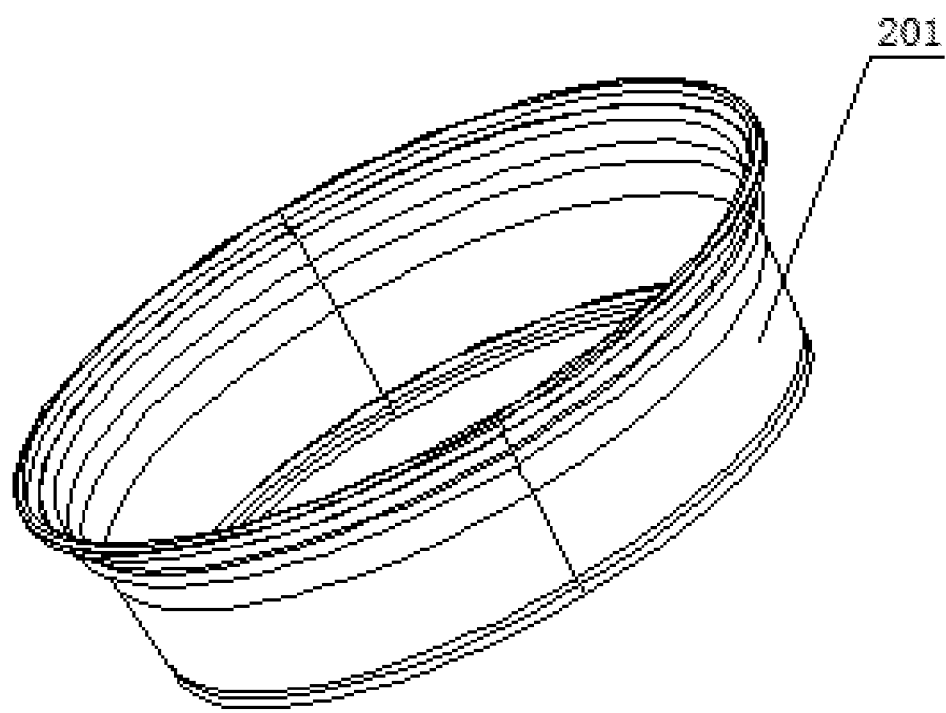
FIG. 5 is a schematic diagram of an outer rim in an automobile hub with a hollow rim according to Embodiment 1 of the present disclosure.
Figure 6:
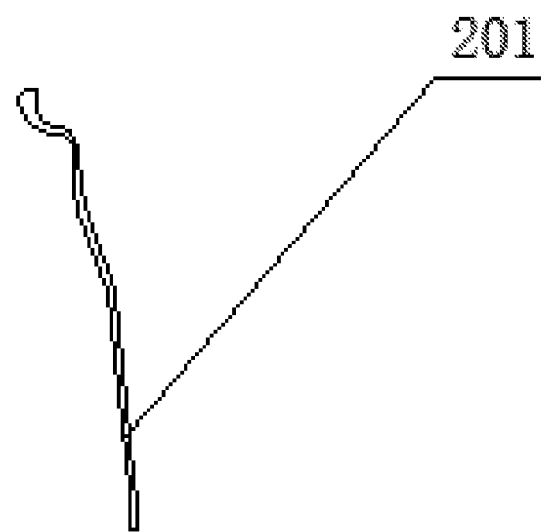
FIG. 6 is a schematic diagram of a semi-sectional view of FIG. 5.
Figure 7:
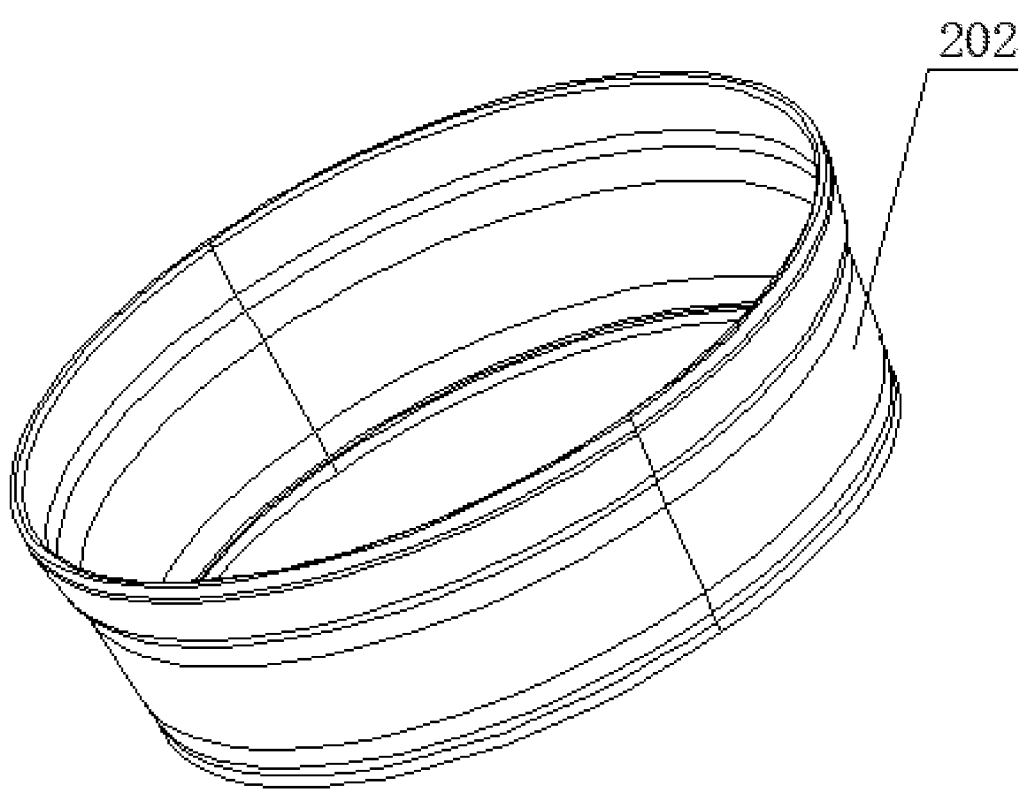
FIG. 7 is a schematic diagram of an inner rim in an automobile hub with a hollow rim according to Embodiment 1 of the present disclosure.
Figure 8:
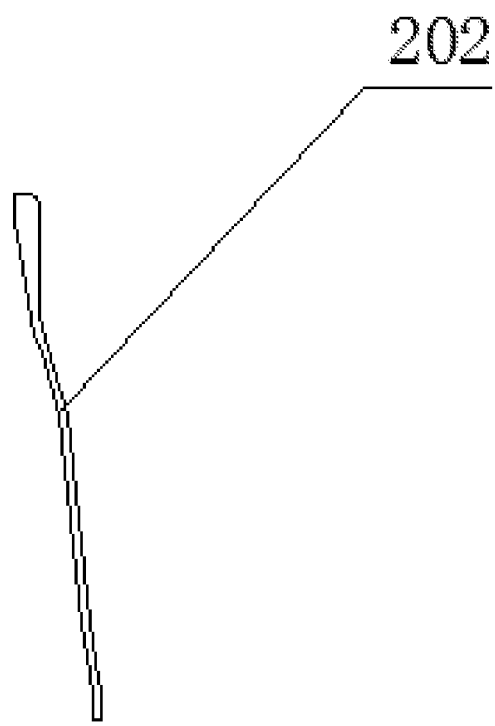
FIG. 8 is a schematic diagram of a semi-sectional view of FIG. 7.

As shown in FIGS. 1 and 2, the hub includes a wheel disc 10 and the rim, in which the rim includes an outer rim 201, an inner rim 202 and an axial end cap 203, and the outer rim and the inner rim are mutually nested. As shown in FIGS. 3 and 4, the outer side of one end of the wheel disc 10 axially includes two rim mounting grooves 101. The rim is inserted into the rim mounting grooves 101 and fixed to the wheel disc 10 through one end of the outer rim 201 and one end of the inner rim 202 respectively, and the other ends of the outer rim 201 and the inner rim 202 are provided with the axial end cap 203. In this embodiment, as shown in FIGS. 5-8, the thickness of the inner rim 202 is 1.5 mm, the thickness of the outer rim 201 is 1.5 mm, and the widths of the rim mounting grooves 101 are 1.5 mm and the depths are 5 mm.

The distance between the outermost ends of the inner rim and the outer rim in the radial direction is 16 mm, that is, the radius-difference between the inner diameter and the outer diameter of the axial end cap 203 is 16 mm, and the thickness of the axial end cap in the axial direction is 7.5 mm.

In this embodiment, the axial end cap further includes two charging pipe joints 204, and each charging pipe joint 204 is provided with a sealing plug (not shown in the figure), so that compressed air with a certain pressure can be injected into the hollow cavity through the charging pipe joints to balance the pressure in a rubber tire. In this embodiment, the pressure of air is one standard atmospheric pressure (atm).

Figure 9:
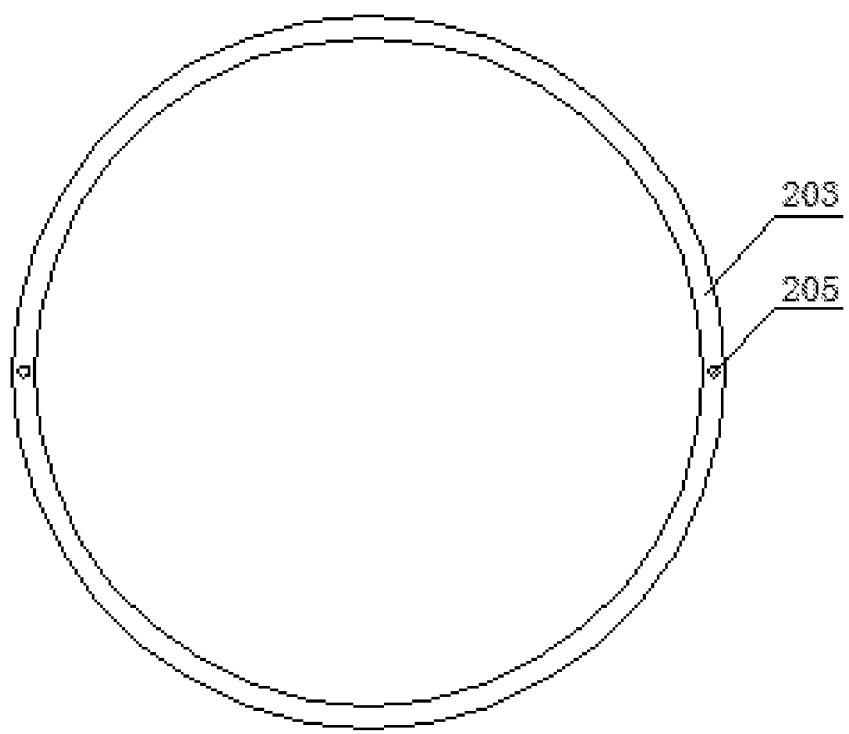
FIG. 9 is a schematic diagram of an axial end cap in an automobile hub with a hollow rim according to Embodiment 1 of the present disclosure.

As shown in FIG. 9, in order to install the charging pipe joints 204, the axial end cap is machined with an axial threaded through hole 205, and the specification of the threaded through hole 205 is M8.

The material of the automobile hub of this embodiment is A356 aluminum alloy, which is a cast aluminum alloy and has good casting properties such as good fluidity, no hot cracking tendency, small linear shrinkage, and good air tightness. A356 aluminum alloy also has a small specific gravity, good corrosion resistance, and a small degree of strength reduction with the increase of casting wall thickness. A356 aluminum alloy is suitable for gas welding, can be used under the as-cast condition, and has improved mechanical properties after modification. It can be understood that aluminum alloys of other materials can also be used.

In addition, it should be noted that the proportions in FIGS. 1-8 are not necessarily consistent for clarity of expression, and the drawings of semi-sectional views are often enlarged.

The automobile hub with the hollow rim in this embodiment can meet the US standards of SAE J175 and SAE J328-2005 for wheels, and also meet the requirements of GB/T 5334-2005 and GB/T 15704-1995 for wheel strength and fatigue performance. Specific test items are listed below (not fully listed):

(1) Repeated Bending Test:

A test device specified in JIS D4103 was used. Load: MB=4.23 kNm; rotation speed: 350 r.p.m.; number of revolutions: 2 million revolutions without cracks.

(2) Radial Fatigue Test:

A test device specified in JIS D4103 was used. Load: F=19.86 kN; rotation speed: 440 r.p.m.; number of revolutions: 2 million revolutions without cracks.

(3) 13° Impact Test:

A test device specified in JIS D4103 was used. Mass of impact hammer: 756 kg; impact positions: 0° (valve hole), 90°, 180° and 270°. Air pressure: 200 kPa; impact height: 230 mm. The test results showed no crack.

(4) 90° Impact Test:

A tire was assembled to a wheel according to an experimental device specified in JIS D4103. Mass of impact hammer: 1010 kg; impact positions: 0° (valve hole), 90°, 180° and 270°; drop height of impact hammer: 254 mm; tire: air pressure: 260 kPa. No complete separation occurred after the test was completed.

Embodiment 2

This embodiment is the same as Embodiment 1 except for the air pressure in the hollow cavity, and the air pressure in the hollow cavity of the automobile hub will be described below.

In this embodiment, the pressure of air in the hollow cavity of the automobile hub is 1.1 atm.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 3

This embodiment is the same as Embodiment 1 except for the air pressure in the hollow cavity, and the air pressure in the hollow cavity of the automobile hub will be described below.

In this embodiment, the pressure of air in the hollow cavity of the automobile hub is 1.2 atm.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 4

This embodiment is the same as Embodiment 1 except for the thickness of the inner rim 202, the thickness of the outer rim 201, and the widths of the rim mounting grooves 101, and the thickness of the inner rim 202, the thickness of the outer rim 201, and the widths of the rim mounting grooves 101 will be described below.

In this embodiment, the thickness of the inner rim 202 is 2 mm, the thickness of the outer rim 201 is 2 mm, and the widths of the rim mounting grooves 101 are 2 mm.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 5

This embodiment is the same as Embodiment 4 except for the air pressure in the hollow cavity, and the air pressure in the hollow cavity of the automobile hub will be described below.

In this embodiment, the pressure of air in the hollow cavity of the automobile hub is 1.1 atm.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 6

This embodiment is the same as Embodiment 4 except for the air pressure in the hollow cavity, and the air pressure in the hollow cavity of the automobile hub will be described below.

In this embodiment, the pressure of air in the hollow cavity of the automobile hub is 1.2 atm.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 7

This embodiment is the same as Embodiment 1 except for the thickness of the inner rim 202, the thickness of the outer rim 201, and the widths and depths of the rim mounting grooves 101, and the thickness of the inner rim 202, the thickness of the outer rim 201, and the widths of the rim mounting grooves 101 will be described below.

In this embodiment, the thickness of the inner rim 202 is 1 mm, the thickness of the outer rim 201 is 3 mm, and the widths of the rim mounting grooves 101 are 1 mm and 3 mm corresponding to the inner rim and the outer rim respectively, and the depths are 4 mm and 6 mm respectively.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 8

This embodiment is the same as Embodiment 1 except for the thickness of the inner rim 202, the thickness of the outer rim 201, and the widths and depths of the rim mounting grooves 101, and the thickness of the inner rim 202, the thickness of the outer rim 201, and the widths of the rim mounting grooves 101 will be described below.

In this embodiment, the thickness of the inner rim 202 is 3 mm, the thickness of the outer rim 201 is 1 mm, and the widths of the rim mounting grooves 101 are 3 mm and 1 mm corresponding to the inner rim and the outer rim respectively, and the depths are 6 mm and 4 mm respectively.

The automobile hub with the hollow rim in this embodiment can also meet the US standards of SAE J175 and SAE J328-2005 for wheels, and also meet the requirements of GB/T 5334-2005 and GB/T 15704-1995 for wheel strength and fatigue performance. Specific test items are the same as Embodiment 1.

Embodiment 9

Figure 10:
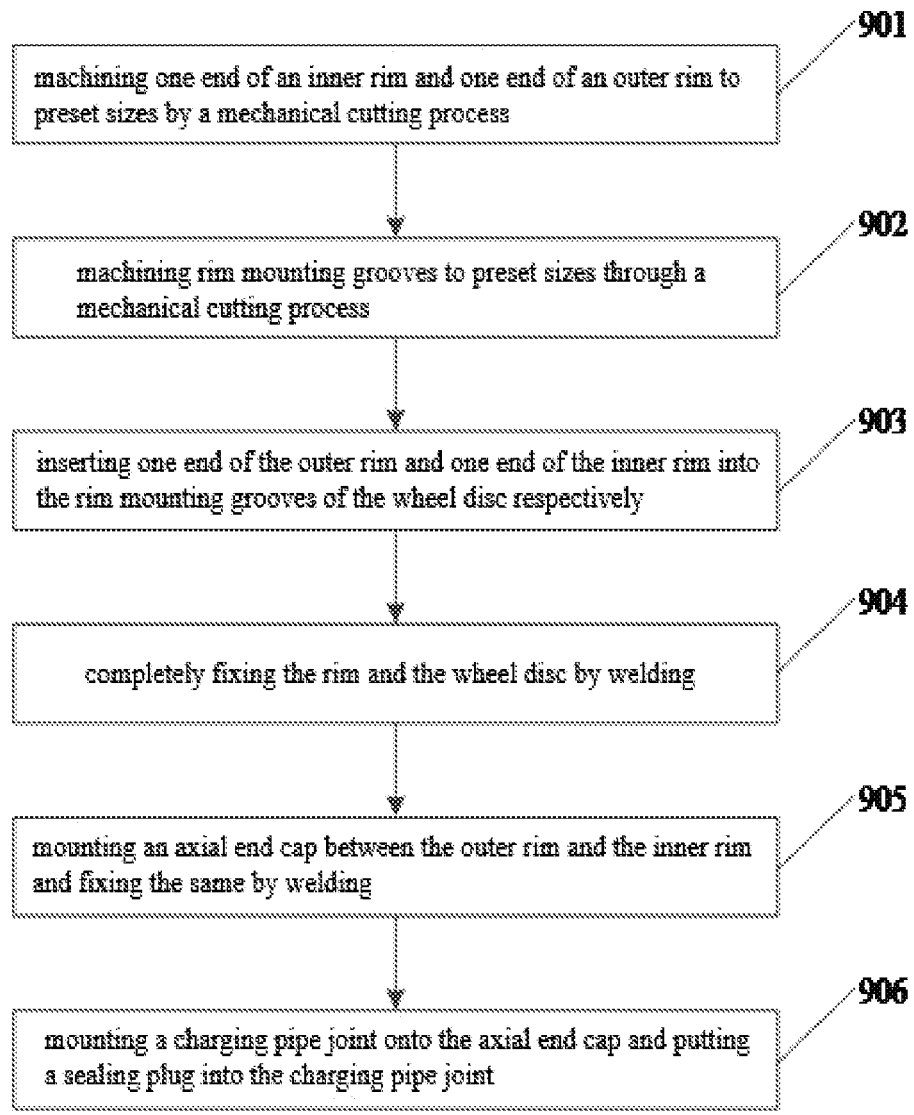
FIG. 10 is a flow chart of a method for assembling an automobile hub with a hollow rim according to Embodiment 7 of the present disclosure.

This embodiment is a method for assembling an automobile hub with a hollow rim, as shown in FIG. 10, and the method includes the following steps:

in step 901, one end of an inner rim and one end of an outer rim are machined to preset sizes by a mechanical cutting process, that is, mechanical cutting is conducted at the end to be mounted to a wheel disc because the dimensional accuracy of casting is not high enough;

in step 902, rim mounting grooves are machined to preset sizes through a mechanical cutting process, also because the dimensional accuracy of casting is not high enough;

through steps 901 and 902, the mounting positions of the rim and the wheel disc can be made more accurate and installation is firmer;

in step 903, one end of the outer rim and one end of the inner rim are inserted into the rim mounting grooves of the wheel disc respectively, basically through transition fit or interference fit due to the accurate sizes after machining, in which the wheel rim can be preliminarily fixed after being inserted into the wheel disc;

in step 904, the rim and the wheel disc are completely fixed by welding, in which during the manufacturing of automobile hubs, the welding fixation technology is mature, the structure is simple, and certain sealing performance is realized, which is the preferred mode;

in step 905, an axial end cap is mounted between the outer rim and the inner rim and the same is fixed by welding, so as to ensure the sealing of joints between the axial end cap and the outer rim and the inner rim, that is, the sealing of the hollow cavity;

in step 906, a charging pipe joint is mounted onto the axial end cap and a sealing plug is put into the charging pipe joint, so as to form the hollow cavity of the hub.

Embodiment 10

This embodiment provides a passenger car, which includes a body and wheels, in which the wheel may include any one of the automobile hubs with the hollow rim according to Embodiments 1-8.

The automobile hub with the hollow rim in this embodiment can be manufactured by the assembly method described in Embodiment 9.

It can be understood that other types of automobiles can also include any one of the automobile hubs with the hollow rim according to Embodiments 1-8, and the automobile hub can also be manufactured by the assembly method described in Embodiment 9.

The above are only preferred embodiments of the present disclosure and not intended to limit the scope of protection of the present disclosure. Any modification, equivalent substitution and improvement made within the spirit and principles of the present disclosure shall be included in the scope of protection of the present disclosure.

The invention claimed is:

1. An automobile hub with a hollow rim, wherein the automobile hub comprises a wheel disc and the rim with at least one hollow cavity, the rim comprises at least two mutually nested rings and an axial end cap at same ends of the at least two rings, and the hollow cavity consists of the rings and the axial end cap; and an outer side of one end of the wheel disc comprises axial rim mounting grooves, and the rim is inserted into the rim mounting grooves and fixed to the wheel disc through an end without the axial end cap.

2. The automobile hub with the hollow rim according to claim 1, wherein the rim comprises two said mutually nested rings, the rings are formed by an outer rim arranged on an outer side and an inner rim arranged on an inner side, the outer side of one end of the wheel disc comprises two rim mounting grooves, and the rim is inserted into the two rim mounting grooves and fixed to the wheel disc through one end of the outer rim and one end of the inner rim respectively.

3. The automobile hub with the hollow rim according to claim 2, wherein the axial end cap further comprises at least one charging pipe joint and a sealing plug, one end of the at least one charging pipe joint communicates with the hollow cavity, and other end of the at least one charging pipe joint is filled with the sealing plug.

4. The automobile hub with the hollow rim according to claim 2, wherein the wheel disc and the rim are both made of aluminum alloy.

5. The automobile hub with the hollow rim according to claim 4, wherein a width of each of the two rim mounting grooves is 1-3 mm and a depth of each of the two rim mounting grooves is 4-6 mm.

6. The automobile hub with the hollow rim according to claim 2, wherein a thickness of the outer rim or the inner rim is 1-3 mm.

7. A method for assembling an automobile hub with a hollow rim, wherein the automobile hub comprises a wheel disc and the rim with at least one hollow cavity, the rim comprises a plurality of mutually nested rings and an axial end cap at same ends of the rings, and the hollow cavity consists of the rings and the axial end cap, and an outer side of one end of the wheel disc comprises axial rim mounting grooves, wherein the method comprises:

inserting first ends of the rings forming the rim into the rim mounting grooves of the wheel disc and fixing the rings; and mounting the axial end cap to end faces of the rings from second ends of the rings to form the rim with the at least one hollow cavity.

8. The method according to claim 7, wherein inserting the first ends of the rings forming the rim into the rim mounting grooves of the wheel disc and fixing the rings comprises:

inserting the first ends of the rings forming the rim into the rim mounting grooves of the wheel disc and fixing the rings to the wheel disc through welding.

* * * * *